(12) United States Patent
Klingenberg et al.

(10) Patent No.: US 7,891,903 B2
(45) Date of Patent: Feb. 22, 2011

(54) RELEASE PIN

(75) Inventors: James C. Klingenberg, Concord, OH (US); David Craig Hageman, Chagrin Falls, OH (US)

(73) Assignee: Jergens, Inc., Cleveland, OH (US)

( * ) Notice: Subject to any disclaimer, the term of this patent is extended or adjusted under 35 U.S.C. 154(b) by 538 days.

(21) Appl. No.: 11/897,664

(22) Filed: Aug. 31, 2007

(65) Prior Publication Data

US 2008/0056814 A1 Mar. 6, 2008

Related U.S. Application Data

(60) Provisional application No. 60/841,380, filed on Aug. 31, 2006.

(51) Int. Cl.
*F16B 21/00* (2006.01)

(52) U.S. Cl. .................. 403/322.2; 411/348

(58) Field of Classification Search ........... 411/348; 74/27, 41; 70/34; 403/24, 242, 275, 322.2, 403/DIG. 6
See application file for complete search history.

(56) References Cited

U.S. PATENT DOCUMENTS

| | | | |
|---|---|---|---|
| 2,147,343 A | 2/1939 | Hokanson | |
| 2,313,883 A | 3/1943 | Lowther | |
| 2,353,851 A | 7/1944 | Rosan | |
| 2,366,459 A | 1/1945 | Rosa | |
| 2,373,083 A * | 4/1945 | Brewster | 411/348 |
| 2,779,228 A | 1/1957 | Meepos et al. | |
| 2,901,804 A | 9/1959 | Williams | |
| 2,968,205 A | 1/1961 | Springate | |
| 2,983,978 A | 5/1961 | Wilgus | |
| 3,037,256 A | 6/1962 | Chapman | |
| 3,046,629 A * | 7/1962 | Malesko | 411/348 |
| 3,052,940 A | 9/1962 | Sellers | |
| 3,068,737 A | 12/1962 | Mewse | |
| 3,085,462 A * | 4/1963 | Myers | 411/348 |
| 3,117,484 A * | 1/1964 | Myers | 411/348 |
| 3,129,472 A | 4/1964 | Hensel | |
| 3,145,441 A | 8/1964 | Strandrud | |
| 3,180,390 A * | 4/1965 | Ockert, Jr. | 411/348 |
| 3,215,023 A | 11/1965 | Becker | |
| 3,233,496 A | 2/1966 | De Pew et al. | |

(Continued)

FOREIGN PATENT DOCUMENTS

GB          957177          *  5/1964

OTHER PUBLICATIONS

Final Office action in U.S. Appl. No. 11/479,662, dated Feb. 18, 2010.

(Continued)

*Primary Examiner*—Victor MacArthur
(74) *Attorney, Agent, or Firm*—Rankin, Hill & Clark LLP

(57) ABSTRACT

A quick release pin has an elongated body having an axial bore therethrough, a shaft extending at least partially through the axial bore for axial movement along the bore; a spindle separately mounted on a first end of the shaft; a button separately mounted on a second opposite end of the shaft; and a handle having a central passage through which the button extends, wherein the handle is mounted to the elongated body. The shaft can be interchanged with a variety of materials and lengths of shafts.

18 Claims, 7 Drawing Sheets

U.S. PATENT DOCUMENTS

| | | | | |
|---|---|---|---|---|
| 3,243,837 | A | * | 4/1966 | Smith .............................. 74/41 |
| 3,276,799 | A | * | 10/1966 | Moore et al. .................... 74/41 |
| 3,277,767 | A | | 10/1966 | Allen et al. |
| 3,596,554 | A | * | 8/1971 | Low et al. .................... 411/348 |
| 3,891,182 | A | * | 6/1975 | Schwerin ..................... 74/527 |
| 4,085,763 | A | | 4/1978 | Thomas |
| 4,185,474 | A | | 1/1980 | Kulischenko |
| 4,433,854 | A | | 2/1984 | Smith |
| 4,913,610 | A | | 4/1990 | Olivieri |
| 4,988,248 | A | | 1/1991 | Flux |
| 5,027,624 | A | * | 7/1991 | Agbay et al. |
| 5,207,544 | A | | 5/1993 | Yamamoto et al. |
| 5,340,255 | A | | 8/1994 | Duran |
| 5,394,594 | A | | 3/1995 | Duran |
| 5,494,323 | A | * | 2/1996 | Huang ........................ 411/348 |
| 5,741,022 | A | | 4/1998 | Wass et al. |
| 6,386,789 | B1 | | 5/2002 | Chausse et al. |
| 6,595,713 | B1 | | 7/2003 | Wilson |
| 6,722,711 | B2 | * | 4/2004 | Kitzis ........................ 411/348 |
| 6,786,669 | B2 | | 9/2004 | Tsui et al. |
| 6,884,013 | B2 | * | 4/2005 | Kiviranta et al. ............. 411/348 |
| 7,574,768 | B2 | * | 8/2009 | Morris et al. ............. 403/322.2 |
| 2007/0003391 | A1 | * | 1/2007 | Stapulionis et al. ......... 411/348 |

OTHER PUBLICATIONS

International Search Report for International Application No. PCT/US2007/019219.

* cited by examiner

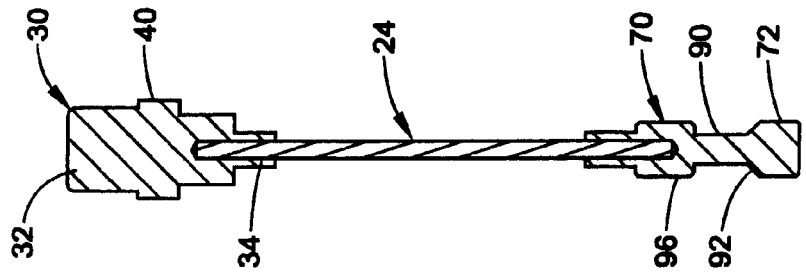
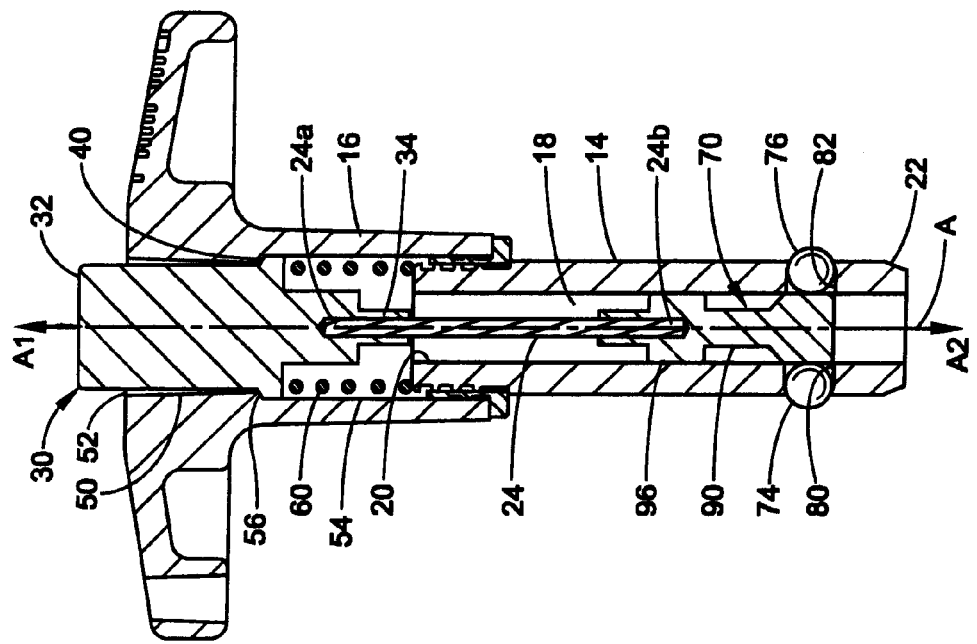
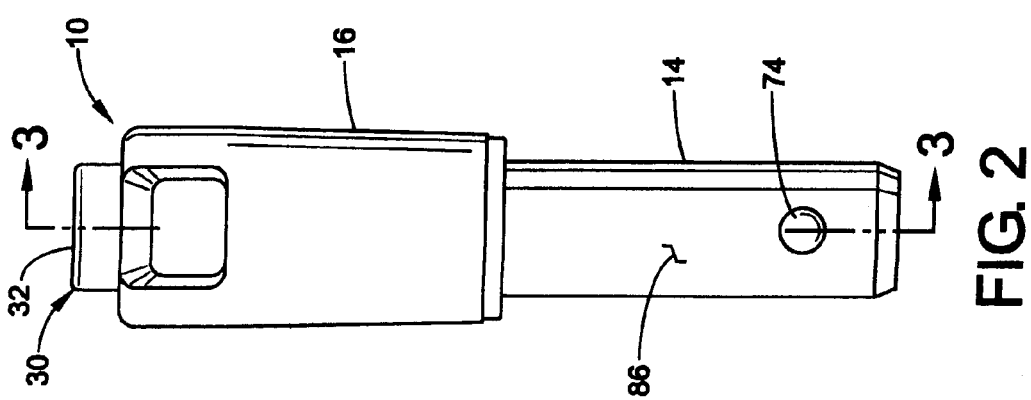

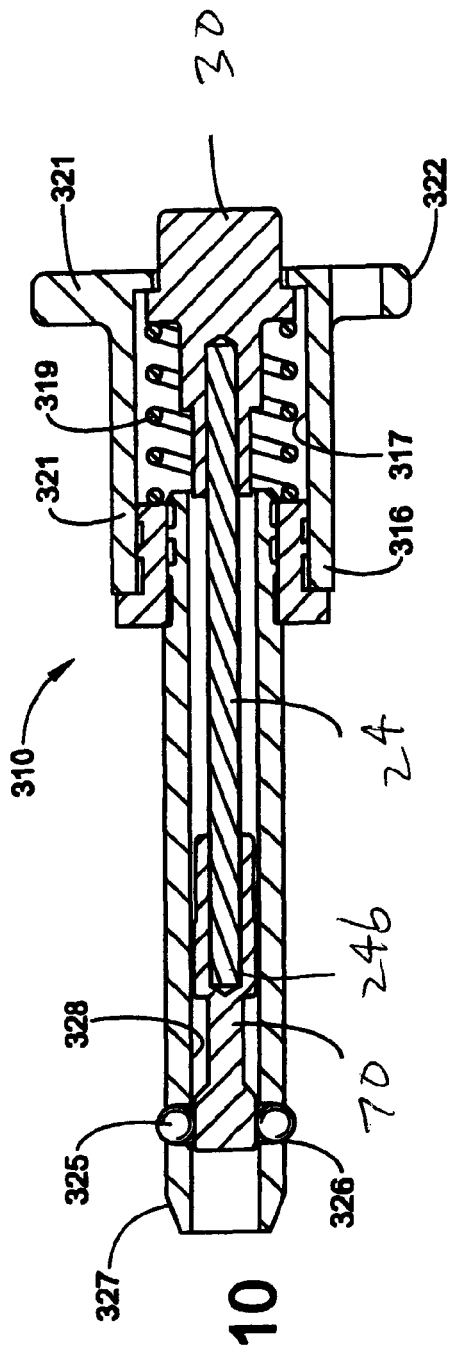
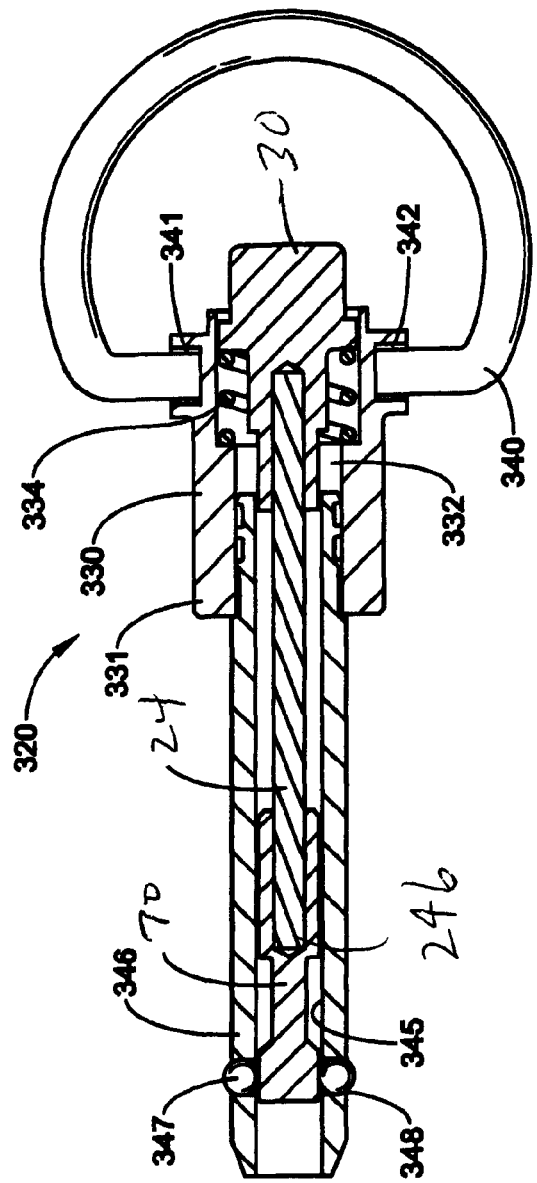
FIG. 10
FIG. 11

RELEASE PIN

CLAIM OF PRIORITY

This application claims priority from Provisional Application Ser. No. 60/841,380 filed on Aug. 31, 2006.

BACKGROUND OF THE INVENTION

The invention of this application relates to release pins and, more particularly, to quick release pins.

Releasable securing devices, such as ball pins, are commonly used for joining two parts such as the parts of industrial fixtures together. Such ball pins have a hollow, hardened stem insertable through mating bores in the two parts to be joined. The device further includes an abutment surface on one side of the stem configured to be pressed against the one side of the stacked parts. The other side of the device includes depressible or retractable balls near the tip of the pin which are configured to engage the other side of the parts when they are in the extended position.

Quick connect ball locking devices generally include a plurality of detents, such as balls, trapped within a tube but protruding out openings therein. A ball actuator is reciprocal within the tube and movable from a first position wherein the balls are retracted substantially within the tube or moved outwardly a sufficient distance to lock the balls within a mating receptacle. An example of such a ball locking device is shown in U.S. Pat. No. 5,394,594 which is incorporated by reference herein. U.S. Pat. No. 3,277,767 also shows such a releasable securing device and is also incorporated by reference herein for showing the same.

However, in order to provide a complete line of such releasable devices, many sizes need to be produced and it has been found that prior devices, such as are shown in U.S. Pat. Nos. 5,394,594 and 3,277,767, require the stocking of many costly components that are not adjustable or configured to work in more than one size device.

More particularly, and with reference to FIG. 1, a prior art release pin RP is shown having a handle H, a knob K and a shank SH. As can be appreciated, these components can change in size based on the application of the pin. Pin RP further includes a spindle SP that is configured to actuate balls B1 and B2. Pin RP further includes a compression spring CS that is mounted within an enlarged bore EB between knob K and shank SH to urge knob K and spindle SP in axial direction A1. A knob shoulder KS on the knob engages abutment AB on handle H to limit this movement. In the position shown, pin RP is in the locked condition wherein land L of spindle SP holds balls B1 and B2 in a projected position. Knob K, extending from the shank, may be moved manually in axial direction A2 to bring a groove G into registry with the balls and thereby permit radially inward movement of the balls to along ramp R to a release or unlocked condition. Spindle SP of pin RP further includes a spindle shaft SS that extends through a shank bore SB in Shank SH to interengage with knob K. Accordingly, the prior art device's spindle extends from its working end by land L to knob K. Thus, each different length of pin RP requires a corresponding spindle SP. Further, since the spindle is subjected to large loads, the entire spindle, including the spindle shaft, must be made from a high grade and heat treatable material.

Release pins are commonly used as shear pins and typically pass through aligned apertures in adjacent plates. A stop surface at one end of the shank engages one of the plates and the balls when projected lie closely adjacent the remote surface of the other plate. Since it is desirable in many cases to restrict to a minimum axial movement of the pin with respect to the plates, existing release pin assemblies must be manufactured in a large number of effective lengths for each nominal diameter for the pin shank. Thus, pin assemblies must be available in a number of lengths measured from the stop surface on the pin shank to the position of the locking balls.

This multiple length requirement necessitates the manufacture of pin shanks of various lengths, and up to the time of the present invention required a corresponding number of spindles of different lengths. In this respect, one of the problems with existing release pins is that they do not have a shaft design which allows for interchangeable shafts with different lengths and materials. Since the spindle is a portion of the shaft, a different spindle shaft must be used for every length of pin. Further, the material needed for the spindle, to resist the inward load produced by the balls under load, is also used on the shaft even though the shaft has much different material requirements. Thus, there is a need for providing a capability for economically producing different shaft lengths and spindles of various material types as well as various methods of securing the shaft to the release pin assembly.

SUMMARY OF THE INVENTION

The invention of this application relates to fastener devices and is particularly directed to quick release pin assemblies that are made from components that include at least one component that is easily adjustable in size, such as length, fit, and/or to permit various strengths of materials to be used to withstand axial loads on the pins, and/or other variations. The release pin according to one aspect of the present invention includes a central shaft that is separate from a ball engaging spindle and an actuating knob or button. The central shaft being movable axially within a longitudinal bore in the shank of a pin to translate the motion of the button to the spindle. Movement of the spindle acts to cause radial movement of balls outward beyond the outer surface of the pin shank to form a projecting abutment. One or more land portions on the movable spindle can be used to hold the balls in a projected position, while a groove or ramp in the spindle can be used to permit the balls to be moved radially inwardly so that they do not project beyond the outer surface of the shank.

The release pin of the present invention has a handle attached to a shank. A shaft is mounted within the bore of the shank and has a button mounted at one end and a spindle mounted at an opposite end.

In another embodiment, a spring can be mounted between the button and the handle and positioned outside of the shank so that the spring can be easily removed and replaced.

In yet another embodiment, the shaft is a flexible shaft extending between the spindle and the button. Accordingly, when the button is depressed, the flexible shaft is subjected to compression and moves the spindle axially such that the balls are allowed to move radially inwardly. However, the release of the button will pull on the shaft, thereby putting the shaft in tension, which in turn pulls the spindle such that the balls are forced radially outwardly. As a result, the flexible shaft is in tension when the locking device is in the locked condition and when it is subjected to working loads. Only the releasing action puts the flexible shaft in compression. This configuration allows the length of the release pin to be easily adjusted by merely changes the length of the flexible shaft. Further, the flexible shaft can be economically stored in rolls or coils and does not need to be made from the same material as the button and/or the spindle.

In yet another embodiment, the button is made from a polymer, the flexible shaft is made from a wire rope and the spindle is made from a heat treated metal. The shaft can be crimped onto or into the spindle and/or the button. In a further embodiment, the button is made from aluminum or stainless steel.

In even yet a further embodiment, the spindle includes a stop to limit the axial movement of the shaft and button.

In accordance with another aspect of the invention, a quick release pin has an elongated body having an axial bore therethrough, a shaft extending at least partially through the axial bore for axial movement along the bore; a spindle mounted on a first end of the shaft; a button mounted on a second opposite end of the shaft; and a handle having a central passage through which the button extends, wherein the handle is mounted to the elongated body.

In accordance with yet another aspect of the invention, a release pin has an elongated body having an axial bore therethrough; the axial bore having an open first end and a closed second end having an opening therethrough; a shaft extending through the bore for axial movement; a spindle mounted at an end of the shaft; a knob mounted at an opposite end of the shaft; a handle mounted to the elongated body, the handle having an axial bore extending therethrough; and a biasing member positioned between the knob and a wall of the handle.

In accordance with yet another aspect of the invention, a method of assembling a release pin, includes attaching a spindle onto an end of a shaft; attaching a knob onto an opposite end of said shaft; attaching a handle to a shank; inserting said shaft, said knob and said spindle along with a pair of balls into an axial bore of said shank and said handle; and inserting a compression spring between said knob and a surface of said shank.

Other aspects of the present invention will become apparent to those of average skill in the art upon a reading and understanding of the following detailed description.

BRIEF DESCRIPTION OF THE DRAWINGS

FIG. 2 is an elevational view, partially sectioned, of a release pin in accordance with an embodiment of the present invention;

FIG. 3 is a sectional view taken from line 3-3 in FIG. 2 shown in a locked position;

FIG. 4 is a sectional view of another embodiment showing only the a button, shaft and spindle;

FIG. 10 is a sectional view of yet even a further embodiment of the present invention which includes another release pin design; and, FIG. 11 is a sectional view of another embodiment of the present invention which includes another release pin design.

DETAILED DESCRIPTION OF EMBODIMENTS

Figure 1:
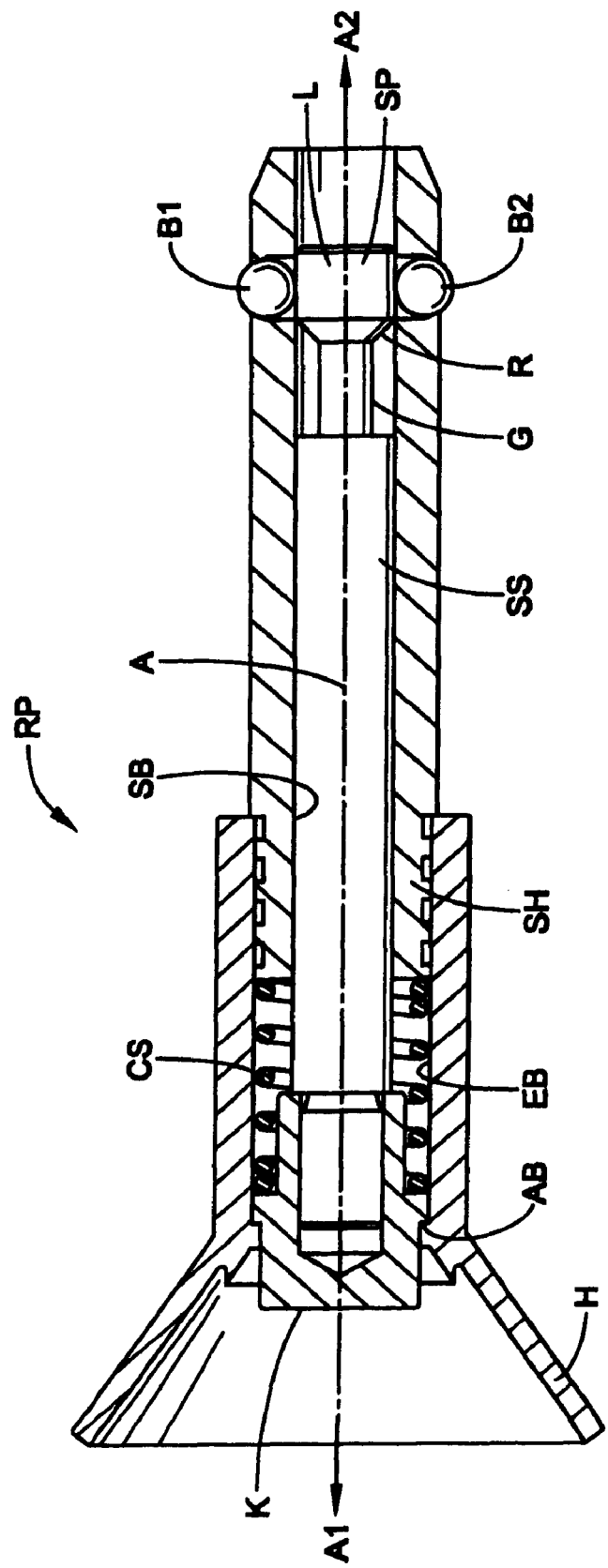
FIG. 1 is a side elevational view in cross-section of an existing release pin.

Referring now to the drawings, in particular referring to FIGS. 2-5, a quick release pin assembly 10 is shown that includes a shank 14 and a handle 16 attached to the shank. As will be discussed in greater detail below, the handle and shank (as with other components) can have a wide range of configurations without detracting from the invention of this application. These configurations can be, at least in part, dictated by the application of pin 10. This can include differences in diameters and length of the respective parts. The shank has a central axial bore 18 having a first and a second end 20 and 22, respectively. Pin 10 further includes a shaft 24 that extends at least partially through bore 18 for axial movement along axis A in opposite axial directions A1 and A2. Shaft 24 has a first end and a second end 24a and 24b, respectively. Pin 10 further includes a spindle 70 that is mounted on end 24b of shaft 24 by any know means in the art including, but not limited to, crimping the spindle onto the shaft.

Pin 10 further includes a knob 30 that can be configured in any one of a number of configurations, including any configuration known in the art, and/or other customer requested designs and configurations. Knob 30 has a thumb end 32, which is configured to be pressed by the end user thereby moving knob 32 in axial direction A2, and a shaft end 34 that can be opposite to thumb end as is shown in these figures. Again, knob 30 and handle 16 can be configured in many configurations without detracting from the invention of this application. In one embodiment knob 30 includes a stop flange 40 that limits axial movement in direction A1. In this respect, handle 16 includes a central passageway 50 extending in axial direction A having a first bore 52 and a second bore 54 that is larger than first bore 52 such that bores 52 and 54 are separated by a flange 56. Knob 30 is configured to move axially in passageway 50, however, flange 56 is configured to engage stop flange 40 of knob 30 to restrict axial movement in direction A1. Pin 10 can further include a compression spring 60 which engages knob 30 to bias the knob in direction A1. Again, interaction between flanges 40 and 56 can be used to limit this biased movement.

Shaft end 34 of knob 30 is configured to interengage with shaft 24 at first end 24a. The shaft can be joined to knob 30 by an means known in the art including, but not limited to, press fitting, brazing, swaging screw threading and/or crimping the knob to the shaft. As a result, movement of the knob is translated to the shaft.

Pin 10 further includes a spindle 70 having a land or edge 72 which serves to hold a pair of radially movable balls 74 and 76 in their fully projected position as is shown in FIG. 3. That is, the balls move radially in lateral bores or openings 80 and 82, respectively, in shank 14. The outer ends of the bores 80 and 82 can be "staked" to reduce the size of the openings which intersect the outer cylindrical surface 86 of the shank 14, and this reduced size opening retains each ball from laterally escaping. Axial movement of spindle 70 in direction A2 brings land 72 of the spindle out of alignment with the balls, such that the balls move into recess 90 thereby allowing balls 74 and 76 to move radially inwardly along a ramped edge 92 so that they fall into openings 80 and 82 such that they no longer extend beyond the outer surface 86 of the shank 14. Then, if the spindle is moved back, namely, in direction A1, balls 74 and 76 are engaged by ramp 92 which moves them radially outwardly such that they again move outwardly beyond surface 86.

In one embodiment, axial movement in direction A2 is by the force exerted by the end user on knob 30. Movement in direction A1 is exerted by the force produced by spring 60. Spindle 70 can further include a bearing surface 96 that can work in connection with land 72 to guide spindle 70 within bore 18 of shank 14 which will be discussed in greater detail below. This guiding movement allows the spindle to be guided in the bore by its engagement with the bore wherein shaft 24 only needs to provide the driving force.

As is discussed above, locking pins, such as pin 10, can be used on a wide range of applications such that there is a need to make release pins of many lengths. Further, these release pins are designed to withstand a wide range of loads and in many cases, a wide range of large loads such that expensive and heat treated materials are needed to withstand these loads without deformation or failure. However, these external forces are limited in their point of engagement with pin 10. In this respect, and for example only, shank 14 can be subjected to a large shear load and spindle 70 can be subjected to a large compression load. However, shaft 24 is not directly subjected to these loads.

As a result, shaft 24 can be utilized to inexpensively account for different lengths of shank 14 in that the expensive and treated material can be used only where needed. Further, using the shaft for changes in length, allow common parts to be used for a wide range of release pins. In this respect, shaft 24 can be formed of an inexpensive material and can be mated with a common spindle, handle and knob. As a result, a single spindle configuration can be utilized for release pins 10 of all lengths that utilize a particular diameter of bore 18. The different lengths of the shank needed for different applications can be accounted for by changes to the length of the shank and different lengths of shaft 24 only. The remaining components can remain the same. Further, since shaft is separated from the majority of the forces, inexpensive and easy to manufacture materials can be used for this component.

In one embodiment, shaft can be a flexible shaft. For example, it has been found that a wire rope can be utilized for shaft 24. As can be appreciated, wire rope is relatively inexpensive and large rolls or coils can be inexpensively inventoried for use with a wide range of release pins. For any give length, the roll of wire rope can be quickly and inexpensively cut to the desired length for the particular release pin. Alternatively, the shaft can be made of a solid wire. As can be appreciated, flexible material is more capable of pulling or being in tension than pushing or being in compression. However, with respect to pin 10, there are two general positions for pin 10. The first is the locked condition wherein balls 74 and 76 are in their outer most position. In this lock condition, the pin is designed to be secured to the components to be held. The second position is the unlocked condition wherein pin 10 is designed to be free to move relative the components to be held. As can be appreciated, holding the pin in the locked condition is more critical than holding the pin in the unlocked condition in that the pin is subjected to the working loads when in the locked condition. With respect to the flexible shaft, when the pin is in the locked condition, shaft 24 is in tension wherein the material properties of, for example, wire rope are ideal. Only when the release pin is in the unlocked condition, namely, when knob 30 is depressed by the end user, is shaft 24 put in compression. However, even when the flexible shaft is in compression, the spindle only needs a minimal amount of axial force to disengage the balls. Therefore, the shaft is only in compression or is pushing when the balls are being released by the end user. Otherwise, the shaft remains in tension. As can be appreciated, other materials, such as a solid wire, and/or other materials known in the art could be used for shaft 24.

In another embodiment, shaft 24 can also be at least partially guided by bore 18. As can be appreciated, if shaft 24 flexes beyond a certain degree, it pushing ability will diminish or be non-existent. However, as will be discussed below with respect to one embodiment of this application, the cross-sectional size of the flexible shaft can be designed to engage bore 18 before deflection becomes critical to prevent over flexing. Further, the bore and/or the shaft can include a guide to further reduce flexing such as a bushing between these components or even a crimped portion in the shaft.

In even yet another embodiment, a self guided spindle 70 can be utilized. As is discussed above, there are two general positions for pin 10. These are the locked condition wherein balls 74 and 76 are in their outer most position and the unlocked lock condition when the balls are retracted. When the pin is in the locked condition, shaft 24 is in tension. Only when the release pin is in the unlocked condition, namely, when knob 30 is depressed by the end user, is shaft 24 put in compression. By utilizing a spindle that is self guided, the guided spindle only needs to be pushed. The spindle maintains its alignment based on its engagement with the bore. In this embodiment, shaft 24 can also be at least partially guided by bore 18.

In a further embodiment (not shown), the release pin includes a knob that actuates along an axis that is not in alignment with the spindle axis. As is described above, the shank has an outer surface that is configured to enter into a hole in two or more components that are to be held together. This outer surface can be coaxial with axis A. The spindle, within the shank, can be configured to move axially along axis A such that it is coaxial with the outer shank surface. Further, in prior art release pins, the spindle is rigidly connected to the knob such that the knob must also move along axis A. However, in this embodiment, the use of a flexible shaft allows the knob to move along an axis other than axis A. Even if the shaft and spindle are coaxial, the shaft can a flexed portion such that the spindle end of the shaft is coaxial to axis A and the knob end of the shaft is not in alignment with axis A. The portion of the shaft that flexes can be within the handle assembly of the release pin.

Figure 5:
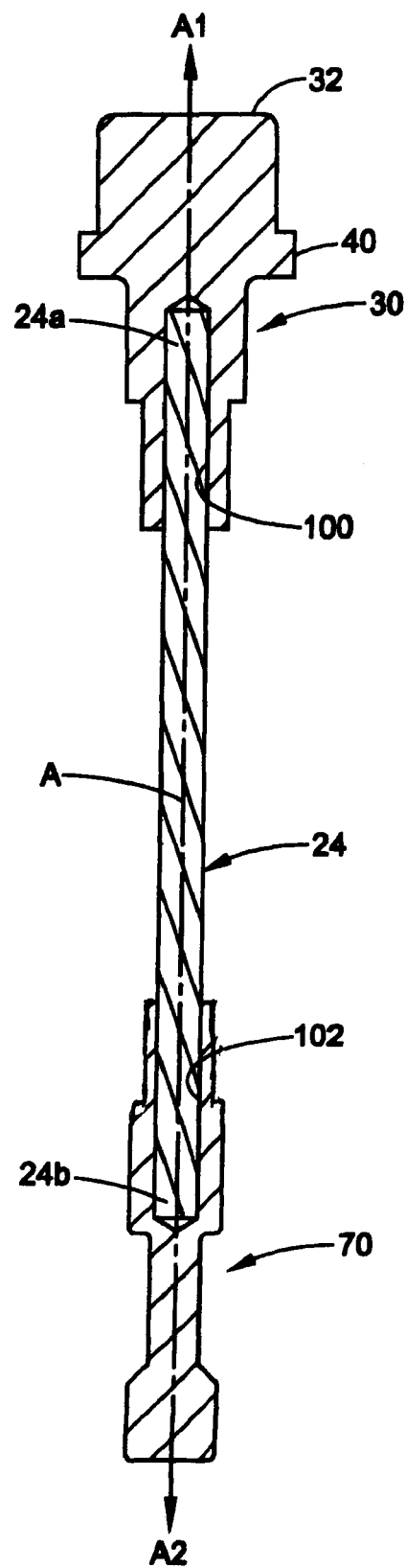
FIG. 5 is an enlarged sectional view of a button, shaft and spindle as is shown in FIG. 3 which includes dimensions for reference purposes only and showing yet another embodiment.
Figure 6:
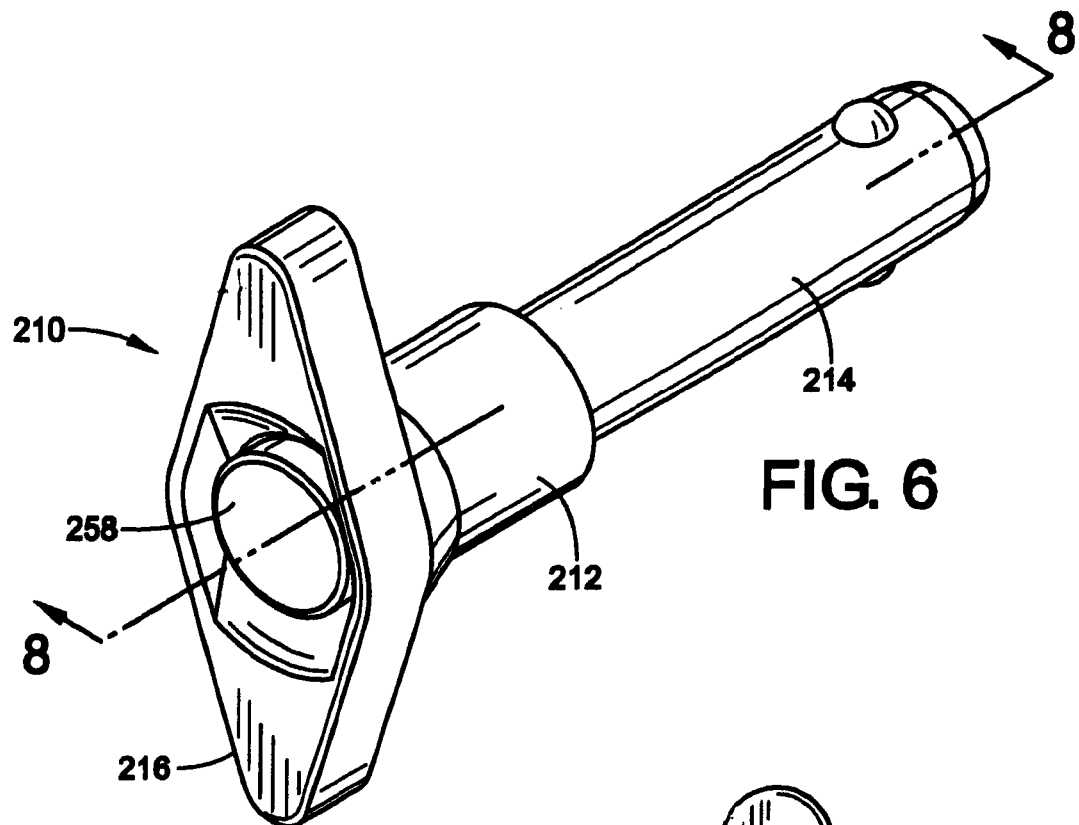
FIG. 6 is a perspective view of yet a further embodiment of the invention of this application.
Figure 7:
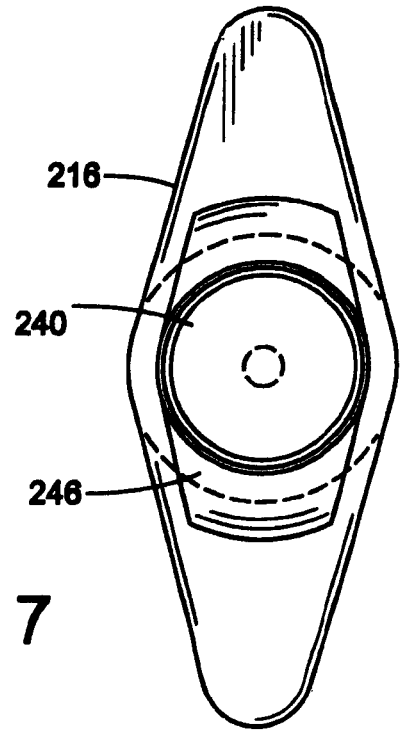
FIG. 7 is a end elevational view in accordance with an embodiment of the present invention.

With special reference to FIG. 5, one particular configuration of release pin 10 is shown for illustrative purposes only. In this respect, flexible shaft 24 can be joined to both knob 30 and spindle 70 by locking bores 100 and 102, respectively. Further, this figure illustrates that shaft 24 can be a smaller diameter than even spindle 70 without detracting from the invention of this application. As is discussed in other areas of this application, the components of pin 10 can be made from a wide variety of materials including material currently known in the art and material that will be used in the art. In one embodiment, and for example only, shaft 24 can be made from a flexible rope, knob 30 can be made from aluminum and spindle can be made from a heat treatable steel. Both the knob and the spindle can be crimped to shaft 24 after the shaft is positioned into the respective locking bores. Based on the dimensional relationships shown in this figure, the shaft will engage the bore before flexing of the shaft becomes critical.

As is discussed above, utilizing a shaft that is separate from both knob 30 and spindle 70 allows the materials of each component to be chosen to maximize strength and durability of the particular component while minimizing material costs and inventory costs of all components.

In yet another embodiment, one size of shaft can be utilized for shanks and/or spindles of different diameters or sizes. As can be appreciated, the outer diameter of the shank is dictated by the particular application the pin will be used for. However, the shaft, which is within bore 18, has no dimensional requirements dictated by the particular application. The shaft must only be sufficient to actuate the spindle. Therefore, a shaft having a particular cross-sectional configuration can be used in connection with shanks and/or spindles having a range of diameters and/or configurations.

Figure 8A:
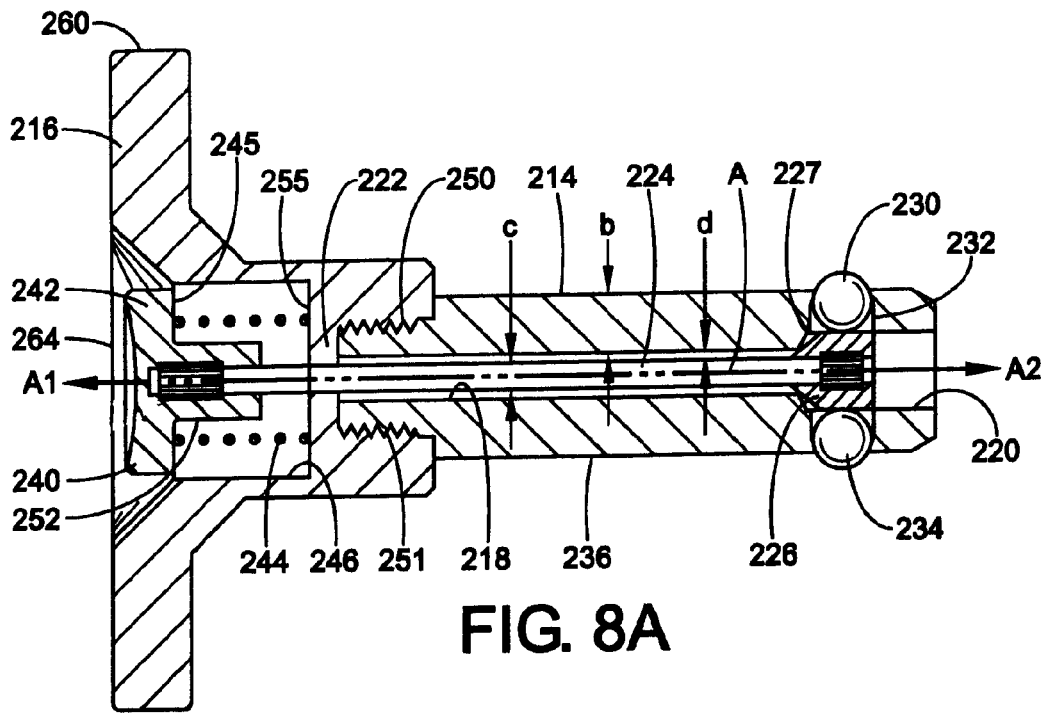
FIG. 8a is a sectional view taken along line 8-8 in FIG. 6 wherein the release pin is in a locked condition.
Figure 8B:
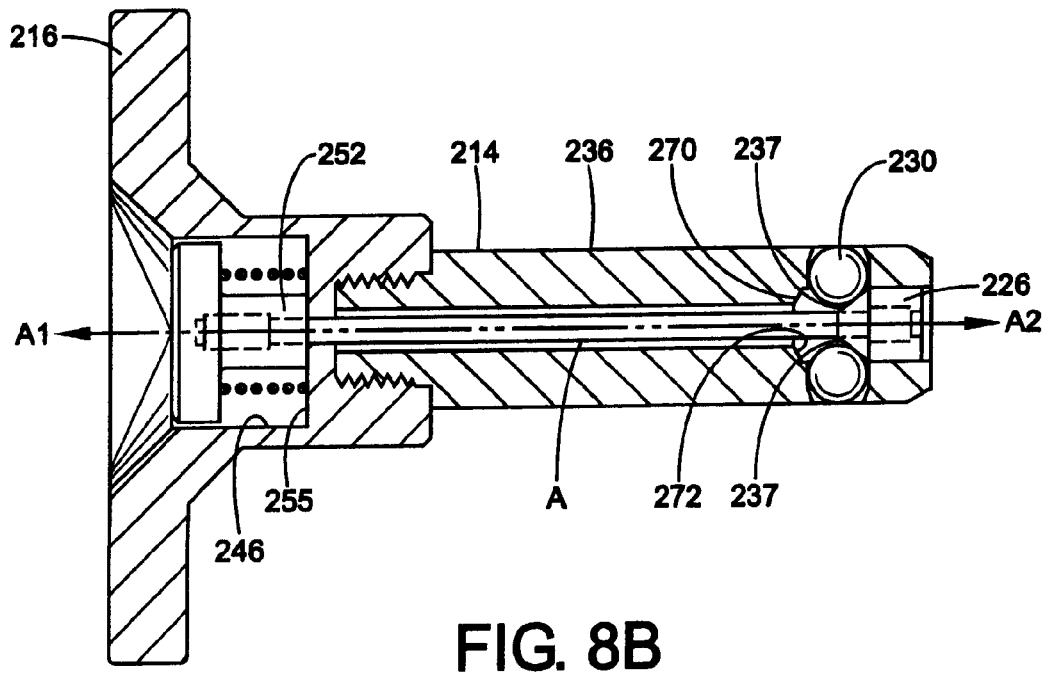
FIG. 8b is a sectional view taken along line 8-8 in FIG. 6 wherein the release pin is in an unlocked condition.

Referring to FIGS. 6-8b, shown is a quick release pin assembly 210 that includes a pin member 212 having a shank 214 and a handle 216. The shank has a central axial bore 218 open at one end 220 and terminating at a shoulder 222. A shaft 224 is mounted within the bore 218 for axial sliding movement. A spindle 226 is mounted on an end portion of the shaft and constitutes a land or edge 227 which serves to hold a pair of radially movable balls 230, 234 in their fully projected position as is shown in FIG. 8A. That is, the balls move radially in lateral bores 232 in shank 214. The outer ends of the bores 232 can be "staked" to reduce the size of the openings which intersect the outer cylindrical surface 236 of the shank 214, and this reduced size opening retains each ball from laterally escaping. Referring to FIG. 8b, shaft 224 is moved further axially to bring the spindle out of alignment with the balls, allowing the balls 230, 234 to move radially inwardly along a ramped edge 237 so that they fall into openings 232 and no longer extend beyond the outer surface 236 of the shank 214.

An actuator button or knob 240 is fixed to the shaft in a manner described above or by any means known in the art. Knob 240 can include a flange 242 which is engaged by a compression spring 244 on an underside 245 of the flange mounted within the enlarged opening or bore 246 of the handle 216. One end of the spring 244 engages surface 255 of the handle and the other end engages underside 245 of the flange 242. The handle is secured to the shank by any convenient means such as, for example by press fitting, brazing, swaging or screw threading. In the particular connection illustrated in the drawings, the shank and handle are connected by means of the threaded fit along the surfaces 250, 251.

Cylindrical portion 252 of the actuator knob can abut surface 255 of the handle bore 246 when the knob is depressed as shown in FIG. 8b. When an exposed end surface 258 of the actuator knob is manually depressed to compress the spring 244, the "land" portion 227 of the spindle moves along the central axial bore 218 and away from the position of the balls and allows the balls to drop into engagement with the ramped portions 237 of the spindle.

Spindle 226 can further include a ramp surface 272 which has multiple functions. As described above, ramp 272 helps guide balls 230 as spindle moves axially in direction A1. However, in one embodiment, ramp 272 can also act as a stop for the movement in direction A1. In this respect, bore 218 can include a stop flange 270 that is configured to engage ramp 272 as it moves axially in direction A1. However, while ramp 272 can be used to also stop axial movement of the spindle and/or knob, the spindle can include a stop that is separate from ramp 272 to stop the axial movement.

Further, while not shown, the invention of this application can also include other stop configurations besides the stop on the spindle and/or the stop on the knob without detracting from the invention of this application. For example, a stop could be position on the shaft such as a crimped bushing on the shaft is configured to engage another component of the pin.

Figure 9:
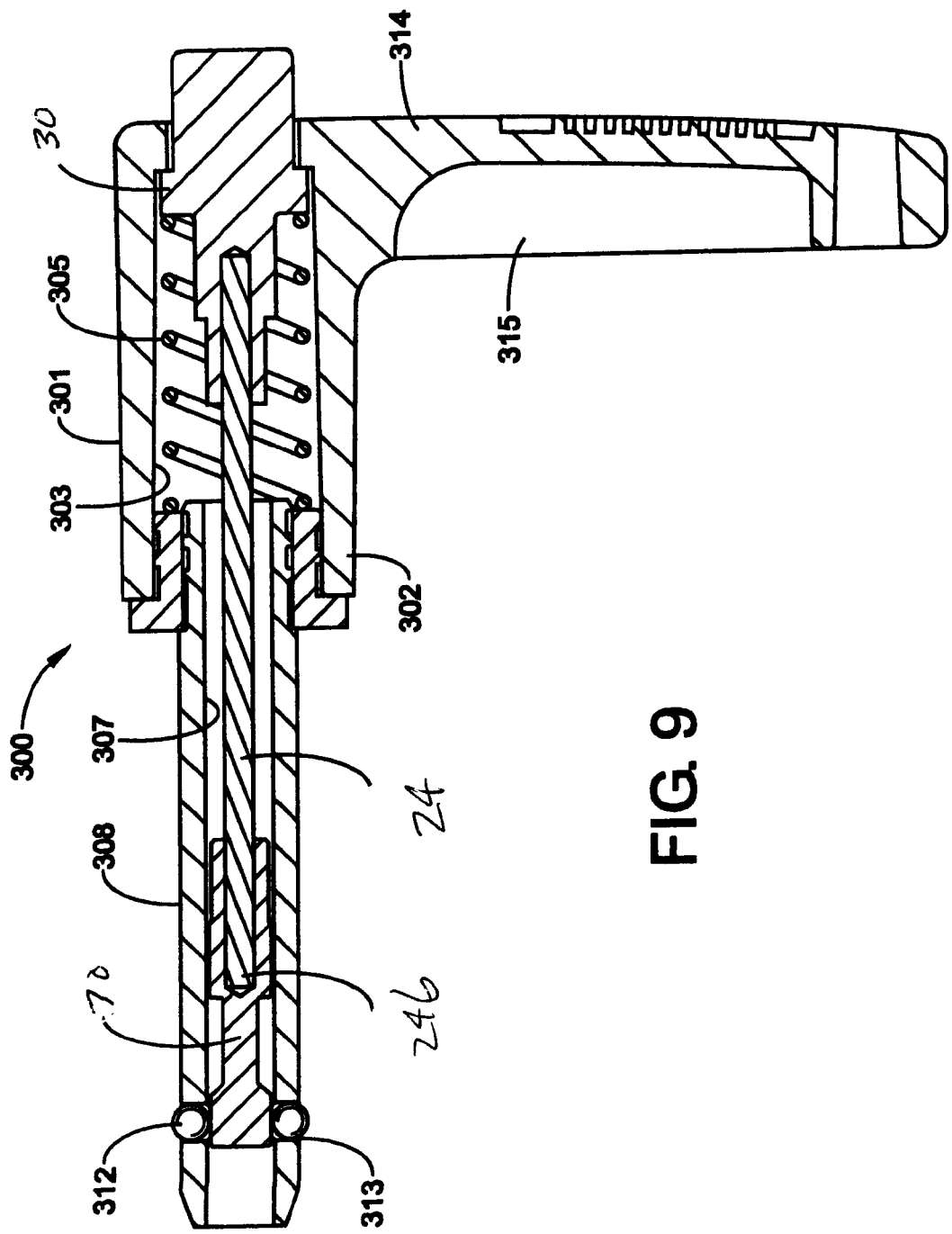
FIG. 9 is a sectional view of yet a further embodiment of the present invention which includes another release pin design.

With reference to FIGS. 9, 10 and 11, shown are quick release pins 300, 310 and 320, respectively. As can be appreciated, the laterally extending walls, such as laterally extending walls of the handle, can be of various shapes or designs to provide a surface for engagement by fingers of the operator without detracting from the invention of this application. For example, referring to FIG. 9, handle 301 of pin 300 includes a first member 302 which has an axial bore 303 therethrough through which knob 30 extends. A compression spring 305 extends around the knob which is attached to one end of shaft 24 which extends into axial bore 307 of shank 308. Spindle 70 is attached at an opposite end 311 of shaft 24. The spindle moves balls 312 into and out of engagement with openings 313 in shank 308, as discussed for earlier embodiments. Handle 301 has a second member 314 which extends substantially 90 degrees from first member 302 and has a grip portion 315 for manually gripping the pin.

Referring to FIG. 10, pin 310 has a handle 316 with an axial bore 317 for receiving knob 30 and a compression spring 319 surrounding the knob. The handle 316 has a first portion 321 which has the axial bore 317 therein and a second portion 321 which includes a flange 322 extending about 90 degrees from a longitudinal axis of the first portion and can serve as a finger or a thumb gripping portion. The knob 30 is attached to a first end of shaft 24 and a spindle 70 is attached at a second end of the shaft. The shaft is received within an axial bore 328 of shank 327. A pair of balls 325 is moved in and out of engagement with mating holes 326 of shank 327, as previously discussed.

Referring to FIG. 11, pin 320 has a handle 330 including a first portion 331 having an axial bore 332 therethrough for receiving knob 30 and a compression spring 334 extending around the knob. The handle has a second portion 340 including a ring which is received within openings 341, 342 of first portion 331. The ring may be rotatable with openings 341, 342. Knob 30 is connected to a first end of shaft 24 and spindle 70 is connected to a second end of shaft 24, which extends into an axial bore 345 of shank 346. Spindle 70 moves balls 347 into and out of engagement with openings 348 in shank 346, as discussed for previous embodiments.

Further, the configuration of the pin of this application can follow release pins know in the art and/or release pins that will be used in the art without detracting from the invention of this application. FIGS. 9-11 are examples of just some design variations of release pin configurations.

While considerable emphasis has been placed on the preferred embodiments of the invention illustrated and described herein, it will be appreciated that other embodiments and/or equivalents thereof can be made, and that many changes can be made in the preferred embodiments without departing from the principles of the invention. Accordingly, it is to be distinctly understood that the foregoing descriptive matter is to be interpreted merely as illustrative of the invention and not as a limitation.

The invention claimed is:

1. A quick release pin comprising:
   an elongated body having an axial bore therethrough,
   a flexible shaft extending at least partially through said axial bore for axial movement along said bore;
   a spindle mounted on a first end of said shaft wherein said spindle and said shaft are separate components assembled together;
   a button mounted on a second opposite end of said shaft,
   a compression spring interposed between said button and said elongated body which engages said button to bias said button in a first axial direction; and
   a handle having a central passage through which said button extends, wherein said handle is mounted to said elongated body, wherein said button comprises a flange, and said handle comprises a flange formed within said central passage configured to engage said flange of said button to restrict axial movement of said button.

2. The pin of claim 1, wherein said button comprises an indentation to be pressed by an end user.

3. The pin of claim 1, wherein said button is fixedly secured to said shaft.

4. The pin of claim 1, wherein said spindle comprises a recess which holds a pair of movable members.

5. The pin of claim 4, wherein said movable members move radially in lateral openings in said elongated body.

6. The pin of claim 5, wherein axial movement of said spindle brings said edge out of alignment with said movable members so said movable members move radially inwardly into openings of said elongated body.

7. The pin of claim 5, wherein axial movement of said spindle engage engages said movable members with a ramped edge of said spindle moving said movable members radially outwardly beyond an outer surface of said elongated body.

8. The pin of claim 1, wherein said spindle comprises a bearing surface to guide said spindle through said axial bore of said elongated body.

9. The pin of claim 1, wherein said button is depressed to move in a second axial direction; wherein said first direction is opposite to said second direction.

10. The pin of claim 1, wherein said spindle and said button and said shaft are not integrally formed.

11. The pin of claim 1, wherein said shaft is flexible.

12. The pin of claim 1, wherein said shaft is guided by said axial bore of said elongated body.

13. The pin of claim 1, wherein said shaft is joined to said button via a locking bore formed in said shaft.

14. The pin of claim 1, wherein said shaft is joined to said spindle via a locking bore formed in said shaft.

15. The pin of claim 1, wherein said spindle is crimped to a said first end of said shaft.

16. A quick release pin comprising: an elongated body having an axial bore therethrough,
    a shaft extending at least partially through said axial bore for axial movement along said bore;
    a spindle mounted on a first end of said shaft wherein said spindle and said shaft are separate components assembled together;
    a button mounted on a second opposite end of said shaft: and
    a handle having a central passage through which said button extends, wherein said handle is mounted to said elongated body;
    wherein said shaft comprises wire rope.

17. The pin of claim 16, wherein said button is formed of aluminum.

18. The pin of claim 16, wherein said spindle is made of heat treatable steel.

* * * * *